June 30, 1964     J. E. TUCKER ETAL     3,139,571
SINE-COSINE MULTI-ROTATION SERVO
Filed June 7, 1961
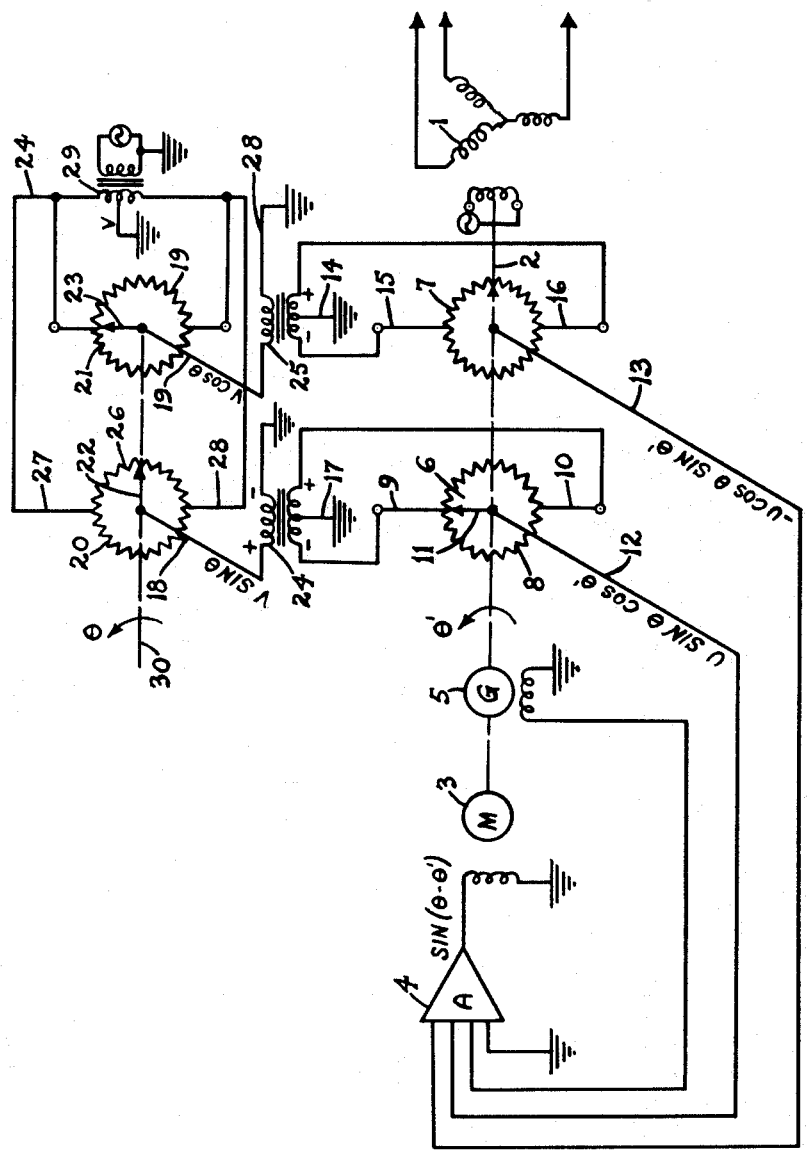
INVENTORS
JOSEPH E. TUCKER
BY EDWARD D. PINKHAM
Lawrence S. Epstein
ATTORNEY

United States Patent Office 3,139,571
Patented June 30, 1964

3,139,571
SINE-COSINE MULTI-ROTATION SERVO
Joseph E. Tucker, Norwood, and Edward D. Pinkham,
Franklin, Mass., assignors, by mesne assignments, to
the United States of America as represented by the Secretary of the Navy
Filed June 7, 1961, Ser. No. 115,489
2 Claims. (Cl. 318—28)

The present invention relates to servo mechanisms and more particularly to servo mechanisms having unlimited rotation.

Certain synchro actuated instruments in simulated trainer cockpits require great accuracy and must utilize servo systems that will accomplish their purposes. For instance, the altitude indicator in a trainer cockpit must have a wide range and yet be infinitely accurate at any point within that range, both in magnitude and rate of change. The instrument, must be able to show any altitude from 0 to 70,000 feet and yet be able to accurately show a change of a few feet any point within that range. Logically, it follows that the rotating instrument must not only show a small number of feet during each revolution in order to obtain the desired accuracy but must also be able to rotate more than 360 degrees in order to show the desired range.

Heretofore, position servos using a single turn potentiometer as the feedback element were not able to obtain the desired range with the accuracy required since they were unable to rotate more than 360 degrees. An integrating servo, since it requires no feedback potentiometer, is capable of exceeding 360 degrees rotation but has other deficiencies. First of all it has a greater tendency to drift than a position servo thus giving spurious readings and secondly, variances in rates of change of altitude cannot be obtained without difficulty.

Therefore, it is an object of the present invention to provide a position servo having unlimited rotation.

Another object of the instant invention is to provide a servo having an output which is proportional to a variable when sine and cosine of that variable are used as inputs to the servo.

Another object of the instant invention is to provide a servo with a broad range of rotation having high accuracy of any point within that range.

Other objects and many of the attendant advantages of this invention will be readily appreciated as the same becomes better understood by reference to the following detailed description wherein the sole figure is a schematic diagram of the invention.

Referring to the figure it may be seen that the transmitter 1 used to transmit information to the dial of an altimeter is coupled to the shaft 2 of a servo motor 3 driven by an amplifier 4 which is fed by a tachometer 5 and two potentiometers 6 and 7 mounted on the shaft of the servo are similar and a description of one will suffice for both. Potentiometer 6 consists of a continuous 360 degree winding 8 to which two taps 9 and 10 are connected at diametrically opposed points on the winding. The arm of the potentiometer 11 is connected to the shaft 2 of the servo so that the output 12 of the potentiometer is the product of the voltage connected across the terminals 9 and 10 and a function of the shaft position determined by the winding of the potentiometer. In the preferred form of the invention one of the potentiometers 7 is sinusoidally wound so that its output 13 would be the product of the voltage 14 coupled across its terminals 15 and 16 and the sine of the servo's shaft 2 position $\phi'$. While the other potentiometer 6 is cosinusoidally wound so that its output 12 is a function of the voltage 17 connected across its input terminals 9 and 10 and the cosine of the servo's shaft 2 position $\phi'$.

The inputs 14 and 17 to the potentiometers on the servo's shaft 2 are the outputs 18 and 19 of other potentiometers 20 and 21 whose wiper arms 22 and 23 are coupled to the inputs of the servo potentiometers by isolating transformers 24 and 25. As it was in the case of servo potentiometers 6 and 7, these potentiometers are the same and a joint description is sufficient. Potentiometer 20 has a single turn continuous winding 26 which is tapped at two points 27 and 28 180 degrees from each other on the winding 3 to supply excitation 29 to the potentiometer. The potentiometer 20 exciting the cosinusoidally wound servo potentiometer 6 is sinusoidally wound while the potentiometer 21 exciting the sinusoidally wound potentiometer 7 is cosinusoidally wound. Both potentiometers are mounted on the same shaft 30 and are excited by the same voltage supply 29 so that the output of the sinusoidally wound potentiometer 20 is the product of the voltage 29 and the sine of the shaft's rotation ($V$ sine $\phi$) while the cosinusoidally wound potentiometer is a function of the voltage and the cosine of the shaft's position ($V$ cosine $\phi$). The isolation transformers 24 and 25 are connected so that the output 12 of the servo shaft's cosinusoidally wound potentiometer 6 would be proportional to the output of the voltage power supply 29 times the sine of the input shaft's rotation 30 multiplied by the cosine of the servo shaft's 2 rotation ($V$ sine $\phi$) while the output 13 of the cosinusoidally wound servo potentiometer 7 would be minus the voltage of the power supply 29 times the cosine of the input shaft 30 multiplied by the sine of the servo shaft 2 ($-V$ cosine $\phi$ sine $\phi'$).

In operation, rotation of the input shaft 30 produces voltage proportional to the voltage $V$ of the power supply 29 times the sine of the angular rotation $\phi$ of the sinusoidally wound potentiometer 20 and the voltage $V$ of the power supply 29 times the cosine $\phi$ of the angular rotation of the cosinusoidally wound potentiometer 23. Thus, the sine data is produced out of the sine potentiometer and the cosine data out of the cosine potentiometer. The sine data voltage is placed across the terminals 9 and 10 of the cosinusoidally wound servo potentiometer so that the output of the cosinusoidally wound servo potentiometer 12 is $V$ sine $\phi$ cosine $\phi'$ and the output of the cosinusoidally wound potentiometer is $-V$ cosine $\phi$ sine $\phi'$. These signals are added in the amplifier 4 so that the motor 3 is driven by a signal proportional to $V$ sine $\phi$ cosine $\phi'$ $-$cosine $\phi$ sine $\phi'$. Since $V$ sine $\phi$ cosine $\phi'$ $-$cosine $\phi$ sine $\phi'$ is equal to sine ($\phi-\phi'$), the servo motor is driven by a signal which is equal to the sine ($\phi-\phi'$) and thus the servo motor's shaft 2 follows up on the position of the input shaft 30.

Obviously many modifications and variations of the present invention are possible in the light of the above teachings. It is therefore to be understood that within the scope of the appended claims the invention may be practiced otherwise than as specifically described.

What is claimed is:

1. A servo system for producing unlimited rotation in simulated meter movements, proportional to a variable of which the inputs of the servo are two-phased apart similar functions comprising, a servo means having an input and output, a first function generating means coupled to said servo's output and the first of said phased apart inputs producing an output proportional to the product of the first generating means of function and the first input, a second function generating means coupled to said servo's output and the second of the two-phased apart inputs producing an output proportional to the product of the second generating means function and the second phased apart input, means coupling the two said outputs to the servo's input so that the servo's output is proportional to the variable of which the inputs are two-phased apart similar functions, said first function generator being a cosinusoidally wound potentiometer and said second function generator being a sinusoidally wound potentiometer.

2. A servo system for producing unlimited rotation in simulated meter movements, proportional to a variable of which the inputs of the servo are two-phased apart similar functions comprising, a servo means having an input and output, a first function generating means coupled to said servo's output and the first of said phased apart inputs producing an output proportional to the product of the first generating means of function and the first input, a second function generating means coupled to said servo's output and the second of the two-phased apart inputs producing an output proportional to the product of the second generating means function and the second phased apart input, means coupling the two said outputs to the servo's input so that the servo's output is proportional to the variable of which the inputs are two-phased apart similar functions, said function generators being single turn, continuously wound potentiometers tapped at two points separated 180 degrees on the coil from one another for inserting inputs with the wiper arm of one potentiometer producing substantially its maximum output while the other wiper arm produces substantially zero output.

References Cited in the file of this patent
UNITED STATES PATENTS

| | | |
|---|---|---|
| 2,471,315 | Dehmel | May 24, 1949 |
| 2,713,143 | Bock | July 12, 1955 |
| 3,015,767 | Taylor | Jan. 2, 1962 |